United States Patent [19]
Foster et al.

[11] 3,772,610
[45] Nov. 13, 1973

[54] ARCLESS ELECTRODE CONSTRUCTION FOR GAS TRANSPORT LASER

[75] Inventors: Jack D. Foster, Los Altos; Russell F. Kirk; Frederick E. Moreno, both of Sunnyvale, all of Calif.

[73] Assignee: GTE Sylvania Incorporated, Mountain View, Calif.

[22] Filed: Sept. 20, 1972

[21] Appl. No.: 290,545

[52] U.S. Cl. .................... 331/94.5, 330/4.3
[51] Int. Cl. ............................. H01s 3/09
[58] Field of Search ............... 331/94.5; 330/4.3

[56] References Cited
UNITED STATES PATENTS

| | | | |
|---|---|---|---|
| 3,577,096 | 5/1971 | Bridges et al. | 331/94.5 |
| 3,633,125 | 1/1972 | Whitehouse | 331/94.5 |
| 3,666,982 | 5/1972 | Wiegand, Jr. | 331/94.5 |
| 3,721,915 | 3/1973 | Reilly | 331/94.5 |

*Primary Examiner*—William L. Sikes
*Attorney*—Norman J. O'Malley et al.

[57] ABSTRACT

Arcing in the continuous electric discharge of a gas transport laser induced by instabilities inherent in a glow discharge in a rectangular cross-section channel is eliminated by mounting an elongated cylindrically tubular cathode in the mainstream transversely of the direction of flow and by disposing a coextensive segmented anode flush with the opposite channel wall and essentially out of the mainstream. The resulting downstream turbulence caused by the cathode provides an electrically homogeneous gaseous mass immediately adjacent the cathode surface which forms a relatively uniform electric current path for supporting a stabilized gaseous discharge across the lasing region. Laminar flow at the surfaces of the anode segments or pads is achieved by flush mounting the pads in the channel wall for further minimizing instabilities in the discharge path.

11 Claims, 8 Drawing Figures

PATENTED NOV 13 1973 3,772,610

ARCLESS ELECTRODE CONSTRUCTION FOR GAS TRANSPORT LASER

BACKGROUND OF THE INVENTION

This invention relates to lasers, and more particularly to high power gas transport lasers.

One of the more promising lasers capable of continuously generating high powers of one kilowatt or more is the well known gas laser which utilizes a gas mixture including $CO_2$ as the lasing medium. A major problem in achieving high power in $CO_2$ lasers, however, has been the excessive heat generated in the gas by the electric discharge. As the current in the discharge is increased in order to increase the output power, heat generated in the active region continues to build up causing degradation of the population inversion primarily because of filling up of the lower energy states and eventual blockading of the lower laser level. Thus, removal of heat from these lasers has been a major obstacle in the quest for continuous high output powers.

Solution of this heating problem has been sought by flowing large masses of gas through the lasing region in either open or closed cycle systems of gas transport lasers. While such gas flow removes the waste heat from the active region, high power glow discharges in the moving gas molecules are difficult to maintain due to instabilities which adversely affect the electric discharge. This is manifested by a breakdown of the broad uniform glow discharge which characterizes normal laser operation into a constricted arc or arcs. Arcing not only drastically lowers lasing efficiency but also burns the electrodes and causes a breakdown of the gas that degrades the gas mixture and necessitates frequent replenishment in closed cycle systems. The sensitivity of the laser to arcing increases as the thermal limit of the gas for supporting a stable discharge is approached and instabilities inherent in the dynamics of gas flowing at high velocities further contribute to the tendency of the electric discharge to change from the glow mode into the arc mode.

One approach to stabilizing the glow discharge in high power gas lasers has been to attempt to offset the heating effect of increased current by increasing the rate of gas flow through the channel. In one instance, for example, it was proposed to move gas through the active laser region of a pulsed laser at supersonic velocities for this purpose. The principal difficulty with this concept is that equipment to contain and control gas flowing at supersonic velocities is complex, costly and sometimes hazardous.

OBJECTS AND SUMMARY OF THE INVENTION

An object of this invention is the provision of an electrode construction in which a stable glow discharge is maintained in a continuously operating high power gas transport laser.

A more specific object is the provision of an anode and cathode construction in a high power gas transport laser which eliminates arcing in the electric discharge in the gas.

Another object is the provision of a high power gas transport laser in which the gas flows at a relatively low velocity, i.e., 30m/sec.

The invention is based on the discovery that gas turbulence induced immediately adjacent to and downstream of a continuous transversely extending cylindrical cathode in combination with essentially laminar fluid flow over a coextensive segmented anode located downstream from the cathode permits exceptionally high current densities in a discharge between these electrodes without arcing. The cylindrical shape of the cathode and its disposition in the gas flow transversely of the direction of flow cause agitation of the gas on the downstream side of the cathode and create a thermally homogeneous and therefore stable medium immediately adjacent to the cathode which supports the electric discharge. The separately ballasted anode pads are disposed flush with the channel wall opposite and downstream of the cathode so that gas flow across the pads is smoothly laminar and electrons arriving at the anode still have a downstream velocity component resulting from the gas flow.

DESCRIPTION OF PREFERRED EMBODIMENTS

Figure 1:
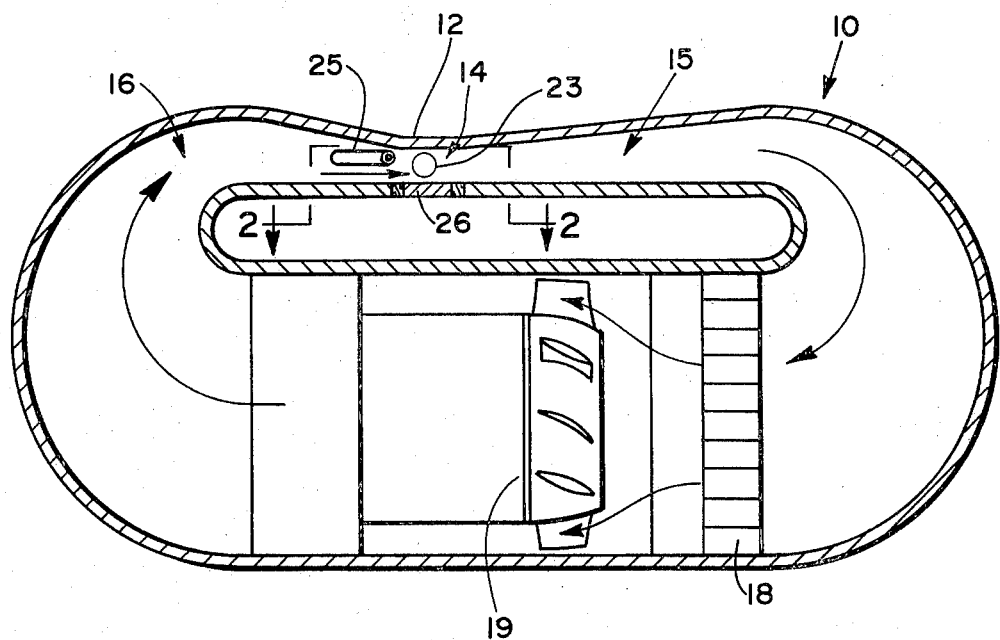
FIG. 1 is a schematic vertical section of a closed cycle gas transport laser embodying the invention.
Figure 2:
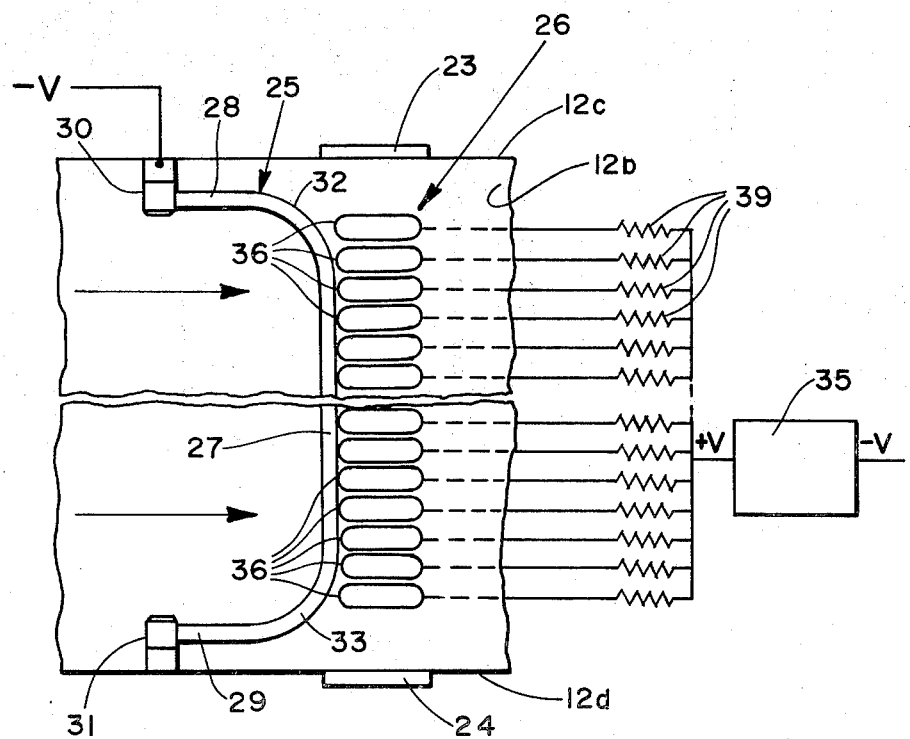
FIG. 2 is an enlarged view of the lasing region of the laser showing the electrode arrangement, the view being taken on line 2—2 of FIG. 1.
Figure 3:
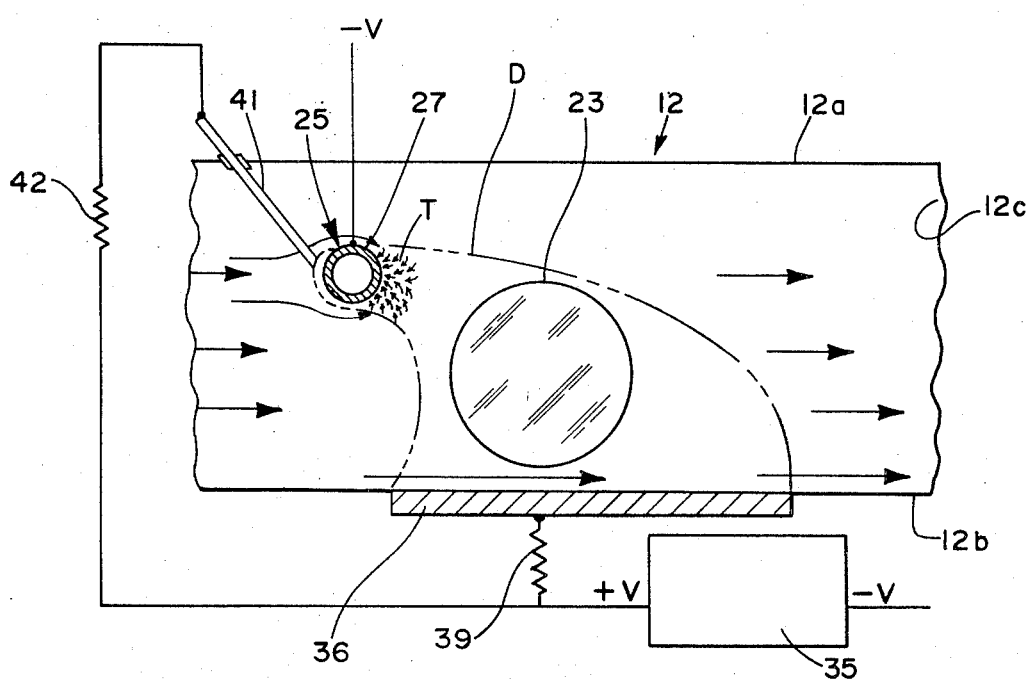
FIG. 3 is an enlarged view of part of FIG. 1 showing the discharge envelope and the effect of electrode configuration on fluid flow in the channel.

Referring now to the drawings, FIG. 1 is a schematic representation of a closed cycle high power gas transport laser system 10 having a channel or duct 12 with a top wall 12a, see FIGS. 2 and 3, a bottom wall 12b and side walls 12c and 12d generally configured to define a closed fluid path through which a gas mixture is recirculated in the direction of the arrows. The channel has a rectangular cross-sectional shape and has a narrow or throat section 14 which defines the active or lasing region of the system, a diffuser zone 15 on the downstream side of the active region in which the gas velocity is reduced and a nozzle section 16 upstream from the active region in which the gas velocity is increased prior to entering the throat. The remainder of the laser system includes a heat exchanger 18 which removes heat from the gas flowing through it and a vane-axial blower 19 which circulates the gas through the channel. The gas mixture preferably used in this system consists of helium, nitrogen and carbon dioxide in well known proportions that support lasing action in the active region 14 for producing coherent light at 10.6 microns. Mounted in the side walls of the channel in optical alignment with the lasing region are mirrors 23 and 24 between which the beam is reflected when a system is operated as either an oscillator or an amplifier. In practice, mirrors 23 and 24 are constructed so as to reflect the coherent beam several times through the active region before it exits as the output, thus increasing the effective length of the laser without increasing its physical size.

The electric discharge in the lasing region 14 of the laser extends between a cathode 25 and an anode 26. Cathode 25 comprises a hollow cylindrically tubular conductor having a discharge supporting portion 27, see FIG. 2, spaced inwardly from top wall 12a and extending perpendicular to the direction of flow of the gas in the channel and side legs 28 and 29 which extend generally parallel to the direction of flow and connected to insulator supports 30 and 31, respectively, mounted on the side walls 12c and 12d of the channel. Cathode legs 28 and 29 are joined with the transverse portion 27 by smoothly curved corner sections 32 and 33, respectively, which provide a uniform and gradual transition between these parts of the cathode. The cathode is connected to the negative terminal −V of an external direct current power supply 35 as indicated and to a source of a coolant, not shown, which directs a cooling medium through the electrode.

Anode 26 consists of a plurality of segments or pads 36 mounted in channel bottom wall 12b in a row generally parallel to and coextensive with transverse portion 27 of the cathode. Pads 36 are electrically insulated from each other and have rounded or curved leading and trailing ends with the leading end preferably approximately vertically aligned with the cathode portion 27. The anode is energized by electrical connection of pads 36 to the positive terminal +V of power supply 35 through ballast resistors 39, respectively, as shown.

Figure 4:
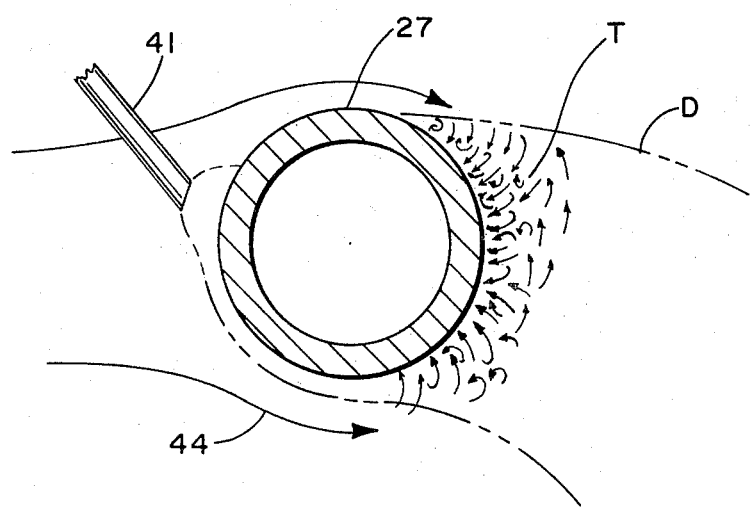
FIG. 4 is an enlarged view of part of FIG. 3 showing the gas turbulence adjacent to the cathode and the action of the starter electrode.

Lasing action in the active region 14 of the system is established by an electrical glow discharge illustrated by the broken line envelope D, see FIG. 3, which extends between transverse portion 27 of the cathode and all of the anode pads 36. The amount of current carried by each pad 36 is limited by the associated resistor 39, the greater the value of the resistor the less is the current conducted through the pad. In order to initiate this glow discharge, the output from the power supply 35 is increased so as to increase the electric field between anode and cathode until the intermediate gas ionizes sufficiently to support the flow of current in a glow discharge mode. In order to facilitate establishment of this electric discharge during the start up of the laser, a wire-like pin electrode 41, see FIGS. 3 and 4, is supported close to the upstream side of the cathode portion 27 and is electrically connected through resistor 42 to power supply 35. The close proximity of electrode 41 to the surface of the cathode causes ionization of the gas at a relatively low voltage compared to that required for ionization by the anode alone, the resulting ions being carried from electrode 41 to the downstream side of the cathode by the flow of gas and thereby lowering the potential required to establish the electric discharge between the cathode and anode. The path of flow of these starter ions is indicated in broken lines at 44 in FIG. 4. Current flow between the starter electrode and the cathode is limited by resistor 42.

The purpose of moving large masses of gas through the lasing region 14 is to remove waste heat so that high powers can be attained. Instabilities in the lasing region can adversely affect the quality of the electric discharge between the anode and cathode as the power is increased. More specifically, temperature gradients adjacent to the cathode tend to produce arcing as the current density in the discharge increases. This condition is further aggravated by the fact that the voltage drop or fall at the cathode is considerably greater than at the anode; the voltage fall at the cathode characteristically being 280 volts while the drop at the anode is characteristically 40 volts. This means that the combination of high voltage fall and instability-induced temperature gradients at the cathode greatly increase the susceptibility of arcing at this electrode as current in the discharge is increased to increase power in the laser output beam.

In accordance with this invention, arcing at high power conditions is eliminated by inducing turbulence in the gas stream immediately adjacent to the downstream side of the cathode and by providing for a smooth laminar flow of the gas over the anode pads. The turbulent condition of the gas at the active surface of the cathode, i.e., the surface which supports the electrical discharge, actually defines a homogeneous gaseous mass in which temperature gradients that induce arcing are absent. This turbulence is indicated at T in FIGS. 3 and 4. In addition, the rounded continuous surface of the cylindrical cathode uniformly distributes the dense flow of electrons efficiently at this electrode so as to further prevent constrictions in the current that cause the glow discharge to break into the arc mode. This continuity of the cathode surface tapers gradually at the ends of the transverse cathode portion 27 by means of the smoothly rounded corner sections 32 and 33 which join the side legs 28 and 29, respectively, without presenting any physical discontinuities that might induce arcing.

Pads 36 comprising the anode are laterally spaced from each other and are aligned in row in the plane of the channel bottom wall downstream and parallel to the transverse portion 27 of the cathode. Each pad is an elongated plane conductor and is configured with rounded leading and trailing ends which promote even distribution of current over the pad so as to prevent arcing. This shape of each pad in which the spacing between adjacent pads tapers gradually between maximum and minimum at the rounded forward and rearward ends also prevents inter-pad arcing at the high current densities which prevail during operation at continuous output power levels of 500 watts or more.

The purpose of locating the anode pads 36 downstream of the cathode 27 and in the plane of channel wall 12b is to insure that electrons arrive at the anode without being swept beyond by the gas flow and that the flow of gas over the pads is essentially smooth and laminar. Instabilities in the anode boundary layer can result in high current density regions which lead to constricted arcs especially if many electrons have been swept downstream by the flowing gas and must migrate back upstream in the boundary layer. Such flow conditions at the anode permit high current densities without arcing because most electrons do not have to flow back upstream in the boundary layer of the anode wall and the boundary layer is very uniform due to the flush mounting of the anode pads.

Figure 5:
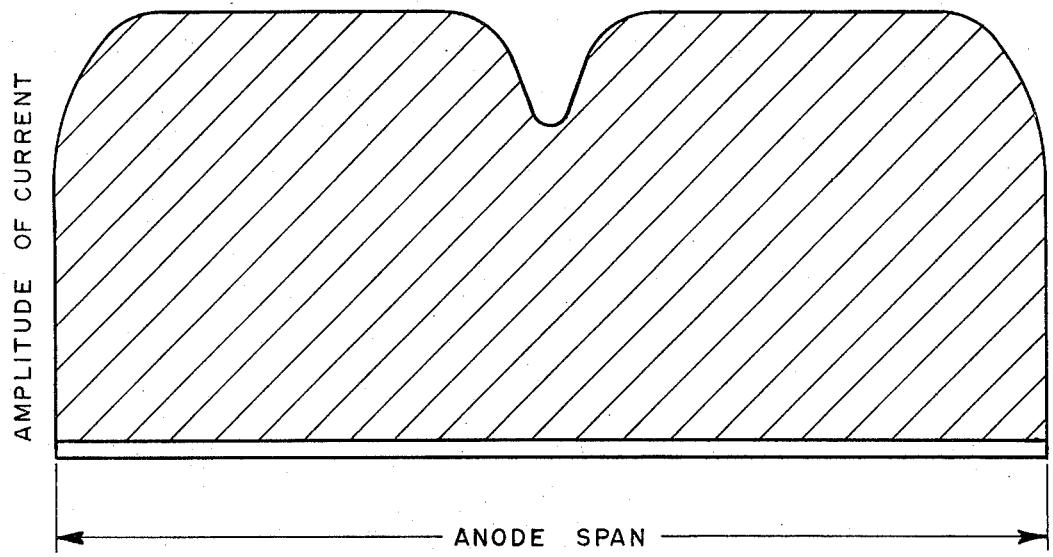
FIG. 5 is a schematic representation of the profile of electric current amplitude in the discharge across the span of the anode.

The flow of gas in throat section 14 of the rectangular cross-section channel is not necessarily uniform across the entire width of the channel at gas velocities of approximately 30 meters per second employed in a preferred embodiment of the invention. Side walls 12c and 12d of the channel as well as the cathode legs 28 and 29 are believed to be at least partly responsible for such non-uniform flow conditions. Also, the temperature at the point in the discharge midway between the ends of the cathode and anode is greater than at other parts of the discharge so as to more likely cause arcing at this location as power is increased. In order to prevent such arcing in accordance with this invention, the values or resistors 39 for certain of the pads 36 are selected to reduce discharge current at the end and center points of the cathode and anode. More specifically, in one embodiment of the invention the resistors for the pads at opposite ends and at the center of the row of pads were selected to have a resistance of 700 ohms while the remaining resistors had a value of 600 ohms. This resistance arrangement reduces the amplitude of current flow at the ends and center of the discharge as indicated by the current distribution curve in FIG. 5 and substantially increases the stability of the glow discharge.

Figure 6:
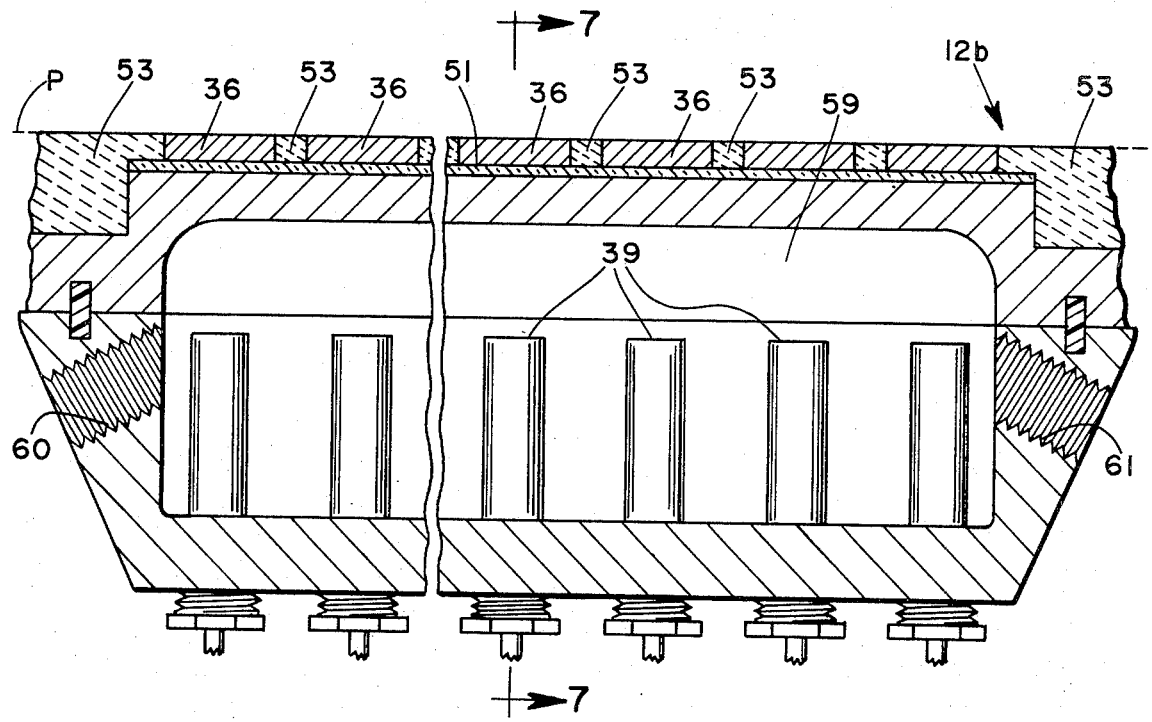
FIG. 6 is a transverse section of the bottom wall of a laser channel showing details of anode pad flush integration into the wall and the means for cooling the pads and their ballast resistors.
Figure 7:
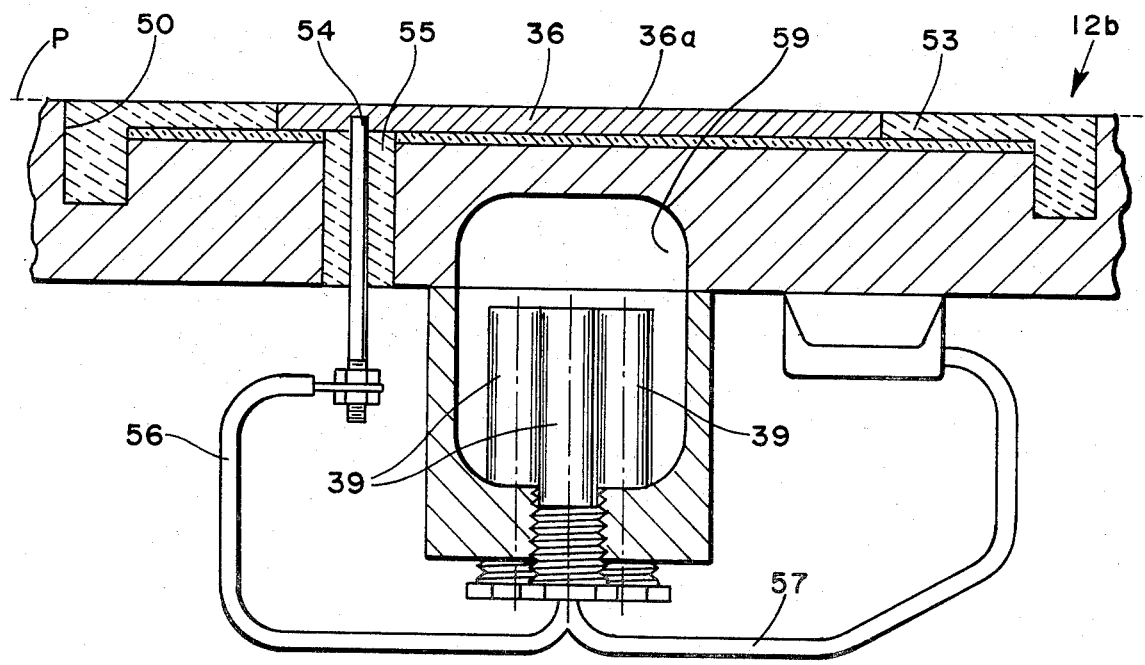
FIG. 7 is a section taken on line 7—7 of FIG. 6.

FIG. 6 and 7 illustrate a preferred construction of the bottom wall 12b of the channel formed with a recess 50 within which pads 36 are disposed on a thin high temperature ceramic sheet 51 such as alumina supported directly on the central portion of the bottom wall, preferably made of aluminum. The pads are laterally spaced from each other and from adjacent parts of the bottom wall by heat resistant castable electrical insulating material 53 such as material sold under the trademark SAUEREISEN by Sauereisen Cements Company, Pittsburgh, Pennsylvania. This material is initially poured in a liquid state in recess 50 and between the pads and thereafter hardens. The pads are thus completely electrically insulated from each other and from adjacent parts of the bottom wall while having a high heat transfer relationship with the latter. The top surfaces 36a of the pads are disposed in the plane P of the inner surface of the channel bottom wall and are the only exposed parts of the pads which support the electrical discharge in the gas. Each pad is electrically connected to a terminal 54 which extends through an insulator 55 in the bottom wall for connection via lead 56 to ballast resistor 39 which in turn is connected to the external power supply by lead 57.

In order to cool the anode pads as well as the ballast resistors, a cooling chamber 59 is formed in the portion of the bottom wall 12b directly under pads 36 and water or an equivalent coolant is pumped through the chamber via ports 60 and 61 at opposite ends of the chamber. Ballast resistors 39 preferably are disposed in staggered positions in chamber 59 as shown to achieve this additional cooling function from the same heat sink.

A gas transport laser system emobdying the invention and which has been built and operated successfully has the following physical and electrical characteristics:

A. General

| | |
|---|---|
| Type of laser system | Closed cycle recirculating, continuous output |
| Gas mixture (by volume) | 72% Helium |
| | 23% Nitrogen |
| | 5% Carbon dioxide |
| Gas pressure | 35 Torr |
| Throat 14 | |
| Width | 41 inches |
| Height | 2 ½ inches |
| Gas velocity in throat | 30 meters/second |
| Gas consumption | <216 cu. ft. (std. temp., press.) for 250 hours |

B. Mechanical
Cathode

| | |
|---|---|
| Length (portion 27) | 34 inches |
| Material | Copper tubing |
| Anode Pads | |
| Number | 34 |
| Length | 4 inches |
| Starter electrode 41 | |
| Diameter | 0.040 inch |
| Spacing from cathode | ¼ inch |

C. Electrical
Output Beam

| | |
|---|---|
| Power (continuous) | >1 KW |
| Diameter | 13 mm. |
| Single mode | $TEM_{oo}$ |
| Wavelength | 10.6 microns |
| Period of operation without arcing | >250 Hrs. |
| Input Power Kilowatts (maximum capacity) | 30 KW |
| Current (at 1 KW output beam power) | 12.0 Amps |
| Voltage (operating) | 1400 volts |

Figure 8:
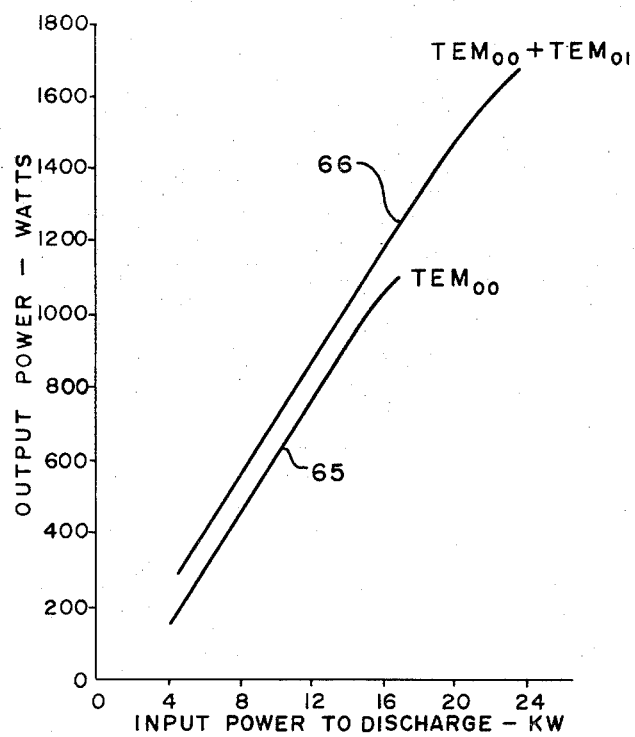
FIG. 8 is a plot of the performance characteristics of a laser system embodying the invention.

Power output data versus input power to the laser discharge for the above described laser system is plotted in FIG. 8. A stable and reliable continuous output of over one kilowatt was obtained in the single $TEM_{oo}$ mode using a limited aperture or spatial filter as indicated by curve 65 and up to 1.68 kilowatts of a multimode $TEM_{oo}$ and $TEM_{01}$ beam was obtained without the aperture as shown by the curve at 66. In each test the laser output beam was continuous and no residual arcing was detected in the discharge below the upper power limits indicated.

What is claimed is:

1. High power gas transport laser apparatus comprising
    a channel having a rectangular cross-section with a width greater than the height and comprising top and bottom walls and side walls,
    a gas mixture comprising carbon dioxide in said channel,
    means for moving said gas mixture in one direction through said channel at a predetermined velocity,
    means for producing an electric discharge in said gas mixture transversely of the direction of flow comprising
        a cylindrically-tubular cathode disposed between the top and bottom walls of said channel transversely of said one direction, said cathode being spaced closer to the top wall than to the bottom wall,
        a planar segmented anode disposed in the plane of the bottom wall transversely of said one direction and downstream from said cathode, and
        means for electrically energizing said electrodes to establish a glow mode electric discharge through said flowing gas mixture between said electrodes, and
    mirror means adjacent the side walls of the channel and optically aligned with said electric discharge for directing a beam of coherent light therethrough.

2. Laser apparatus according to claim 1 in which said last named means comprises a direct current power source having positive and negative output terminals electrically connected to said anode and cathode, respectively, and a starter electrode supported adjacent to the upstream side of said cathode and electrically connected to the positive terminal of said source, the spacing between the starter electrode and cathode being substantially smaller than the spacing between the anode and cathode.

3. High power gas transport laser apparatus comprising
    a channel having a generally rectangular cross-section, means for moving gas through said channel at a predetermined velocity and pressure, electrodes disposed to support an arcless glow discharge through said moving gas in the channel comprising a cylindrically tubular continuous cathode having a main body portion within said channel and extending transversely of the direction of gas flow whereby to produce turbulence in the gas adjacent to the downstream side of said body portion, an anode coextensive with and spaced from said main body portion of said cathode, said anode comprising a plurality of plane conductive pads electrically insulated from each other and disposed in the plane of the inner surface of said channel opposite from the cathode whereby the flow of gas over the pads is substantially laminar, and means for energizing said electrodes to support a continuous glow discharge in said gas.

4. Laser apparatus according to claim 3 in which said energizing means comprises a source of direct current power having a positive terminal connected in parallel to said pads and a negative terminal connected to said cathode.

5. Laser apparatus according to claim 4 with a ballast resistor connected in series between each pad and said source, the resistance of the resistors connected to certain of the pads being different from the resistance of others of the the resistors whereby the value of current in the discharge varies across the electrode span.

6. Laser apparatus according to claim 5 in which the resistance of the resistors connected to the pads at the center and ends of said plurality of pads is greater than the other resistors whereby current at the ends and center of the discharge is less than at other locations.

7. Laser apparatus according to claim 3 in which said cathode has side legs extending upstream from said main body portion and are connected to the body position by smoothly curved continuous sections.

8. Laser apparatus according to claim 3 in which each of said pads has parallel side edges and curved leading and trailing ends whereby the spacing between adjacent pads at such ends changes gradually.

9. Laser apparatus according to claim 3 in which said channel has a bottom wall with a recess formed on the inner surface, said pads being disposed in said recess with the top surfaces of the pads in the plane of the bottom wall inner surface, and means for electrically insulating said pads from said bottom wall and establishing a relatively high heat transfer relation with said wall.

10. Laser apparatus according to claim 9 in which said bottom wall has a hollow chamber formed therein under said pads, and means for directing a coolant through said chamber for removing heat from said pads.

11. Laser apparatus according to claim 10 in which said ballast resistors are disposed within said chamber.

* * * * *

UNITED STATES PATENT OFFICE
CERTIFICATE OF CORRECTION

Patent No. 3,772,610      Dated November 13, 1973

Inventor(s) Jack F. Foster, Russell F. Kirk, Frederick E. Moreno

It is certified that error appears in the above-identified patent and that said Letters Patent are hereby corrected as shown below:

Claim 1, line 43, after "disposed" insert --substantially--.

Claim 3, line 15, after "disposed" insert --substantially--.

Signed and sealed this 2nd day of April 1974.

(SEAL)
Attest:

EDWARD M. FLETCHER, JR.
Attesting Officer

C. MARSHALL DANN
Commissioner of Patents